(12) United States Patent
Salome et al.

(10) Patent No.: US 7,186,807 B2
(45) Date of Patent: Mar. 6, 2007

(54) PROCESS FOR EXTRACTING THE COMPONENTS OF PEA FLOUR

(75) Inventors: Jean-Paul Salome, Vieux Berquin (FR); Jean-Marc Verrin, Beuvry la Foret (FR); Claude Fache, Beuvry la Foret (FR); Robert Houard, Saint-Floris (FR)

(73) Assignee: Roquette Freres, Lestrem (FR)

( * ) Notice: Subject to any disclaimer, the term of this patent is extended or adjusted under 35 U.S.C. 154(b) by 0 days.

(21) Appl. No.: 10/666,223

(22) Filed: Sep. 17, 2003

(65) Prior Publication Data
US 2004/0091600 A1    May 13, 2004

(30) Foreign Application Priority Data
Sep. 18, 2002   (FR) ................... 02 11547

(51) Int. Cl.
*A61K 36/00*    (2006.01)
*A23K 1/00*    (2006.01)
*A21D 2/00*    (2006.01)

(52) U.S. Cl. .................. 530/370; 426/615; 426/622
(58) Field of Classification Search ............ 426/622, 426/35.7, 615, 573, 549; 241/24.1; 127/65; 530/370
See application file for complete search history.

(56) References Cited

U.S. PATENT DOCUMENTS

| | | | |
|---|---|---|---|
| 5,034,227 A * | 7/1991 | Nickel | 424/757 |
| 5,346,892 A * | 9/1994 | Fitt et al. | 514/60 |
| 5,573,948 A | 11/1996 | Olsen et al. | |
| 5,916,645 A | 6/1999 | Stauderer et al. | |
| 5,972,119 A | 10/1999 | Krikken | |
| 6,555,003 B2 * | 4/2003 | Ferro et al. | 210/632 |

FOREIGN PATENT DOCUMENTS

| | | |
|---|---|---|
| EP | 0 443 692 A2 | 8/1991 |
| EP | 0 517 965 A1 | 12/1992 |
| WO | 00/40787 A1 | 7/2000 |
| WO | 00/40788 A1 | 7/2000 |

OTHER PUBLICATIONS

A Derwent English Abstract of the German Patent DE 2922247 A (Dec. 6, 1979).
A complete document entitled "Production and Functionality of Starches and Protein Isolates from Legume Seeds (Field Peas and Horsebeans0"-J.R. Vose—abstract from Cereal Chemistry, vol. 57, No. 6, 1980, pp. 406-410. XP008017257.
A complete document entitled "Yield of Starch and By-products in the Processing of Different Varieties of Wrinkled Peas on a Pilot Scale" F. Meuser et AL—Abstract from Cereal Chemistry, vol. 74, No. 4, 1997, pp. 364-370. XP001149013.
A Derwent English Abstract of the German Patent DD 275 609.
A Derwent English Abstract of the French Patent FR 2 256 727.
Jianhua et al., Report on Centrifugal Separation of the components of Pea, *Science and Technology of Foodstuff*, No. 1, 1997, pp. 25-27.

* cited by examiner

*Primary Examiner*—Robert A. Wax
*Assistant Examiner*—Robert B. Mondesi
(74) *Attorney, Agent, or Firm*—Young & Thompson

(57) ABSTRACT

The present invention relates to a process for extracting and refining the components of pea flour, characterized in that it consists of the steps of preparing a flour by grinding dried peas previously cleaned, sorted, blanched, freed of dust, introducing the flour thus obtained into water and separating the components of the pea flour using at least one of the pieces of equipment from a potato starch factory chosen from the group consisting of hydrocyclones, centrifugal decanters and sieves, without a stage for separating the internal fibers of the pea being carried out beforehand, devices comprising at least one of these pieces of equipment, and to a particular quality of pea starch thus extracted.

11 Claims, No Drawings

PROCESS FOR EXTRACTING THE COMPONENTS OF PEA FLOUR

The invention relates to a process for extracting and refining the components of pea flour, i.e. the starch, the proteins, the internal fibers and the solubles, with the aid of at least one of the pieces of equipment borrowed from a potato starch factory.

The invention thus makes it possible, through a particular use of at least one of the pieces of equipment borrowed from a potato starch factory, to extract and refine the components of pea flour without the need to remove beforehand the internal fiber components of the pea.

For the purposes of the invention, the expression "potato starch factory" is understood to mean an industrial unit for extracting starch, proteins and pulp (fibers) from potato.

The expression "pieces of equipment for a potato starch factory" is also understood to mean, for the purposes of the invention, the hydrocyclones and the sieves used in the starch extraction phase, and the centrifugal decanters used in the phase for extracting proteins from the potato vegetation water.

The invention thus relates to a first process for extracting and refining the components of pea flour using centrifugal decanters and then sieves in a configuration used in a potato starch factory.

The invention also relates to a second process for extracting and refining the components of pea flour using hydrocyclones and then centrifugal decanters in a configuration used in a potato starch factory.

The invention finally relates to devices for extracting the components of pea flour, devices comprising at least one of the pieces of equipment for a potato starch factory, chosen from the group consisting of hydrocyclones, centrifugal decanters and sieves.

More particularly, a first device for extracting the components of pea flour comprises, as pieces of equipment for a potato starch factory, centrifugal decanters and then sieves.

A second device for extracting the components of pea flour comprises, as pieces of equipment for a potato starch factory, hydrocyclones and then centrifugal decanters.

The description of these pieces of equipment and their use in a potato starch factory is well documented in the state of the art. Reference can thus be made for example to the patents EP 443,692 or EP 517,965 for the use, in a starch factory, of hydrocyclones, or to patent FR 2,256,727 of which the applicant company is proprietor, for the use, in a starch factory, of centrifugal decanters.

It is known to persons skilled in the art that potato starch factories are active at best for 4 to 6 months per year.

One concern of industrialists is the profitable exploitation of these pieces of starchmaking equipment between campaigns in order to ensure the use of the equipment throughout the year.

To the knowledge of the applicant company, the only adaptations of pieces of equipment of a potato starch factory for other plants, with the aim of using said pieces of equipment between campaigns, were designed for the treatment of rape plant or for enhancing the value of grasses (in particular of alfalfa) or of beet haulms.

International patent application WO 93/16,109 describes an adaptation of the pieces of equipment for a potato starch factory which relates to the fractionation, in common pieces of equipment and by alternate campaigns, of potato and rape plant.

The pieces of equipment common in the treatment of the two plants consist of a grater, a centrifugal decanter, a centrifugal sieve, a cooker, an evaporator, a spray-dryer, a centrifuge and a loop dryer, to which an oil separator is added in order to treat the rape plant and to which a washer, a decanter, a continuous cooker and a vacuum rotary filter are added in order to treat the potato.

However, the equipment normally used to treat potato is in fact here more particularly modified so as to be able to treat exclusively oleaginous plants, for the extraction of oil, and this modification cannot therefore be adapted to the pea.

Indeed, international patent application WO 93/16,109 describes especially a modification of the process for treating potato in order to bring about the extraction of the oil and of the proteins from the rape plant by means of a particular enzymatic treatment, and the addition of a specific additional material, in this case an oil separator.

There is therefore nothing which would make it possible to think that the pieces of equipment used could be transposable to the pea, which is not an oleaginous plant, while the possibility of adapting this process to other oleaginous or oil- and protein-rich plants such as sunflower, soybean and flax is, on the contrary, described.

International patent applications WO 00/40,787 and WO 00/40,788 describe another adaptation of these pieces of equipment for a potato starch factory to other plants for enhancing the value of grasses or of genetically modified plants.

This adaptation, which uses the grinding equipment and the centrifugal conical sieve equipment of the pieces of equipment for a potato starch factory, makes it possible to recover especially the fiber fractions of the plants such as grass, potato haulms, pea haulms or beet leaves and necks.

The pressed juices of these plants are treated by flocculation, like the red water from potatoes, in order to extract therefrom some of the proteins in the form of isolates and, on the other hand, a sugar syrup.

The treatment of genetically modified plants described in international patent application WO 00/40,788 is envisaged for recovering molecules of therapeutic interest from the pressed juices.

The processes described in these two international patent applications also aim to enhance the value of the plant materials which are usually substandard in order to recover therefrom the fiber portion, essentially for papermaking applications (manufacture of paper pulps).

International patent application WO 00/40,787 indeed mentions the treatment of pea, but only for its grassy part, i.e. the haulms.

The technological constraints linked to the separation of starch and of proteins from the pea seed are completely different in nature from those encountered for the separation of sugars and proteins from the pressed juices of pea haulms.

The pea is a vegetable whose seed protein content varies from 25 to 35%, the starch content between 35 and 50%, the fiber content (cellulose and hemicellulose) varies between 12 and 18%, the content of solubles varies between 8 and 12% and the content of lipids varies between 1 and 2%.

The pea, like the field bean, has been historically used as a soybean substitute for its high content of proteins, intended as livestock feed.

About 95% of its applications are thus in livestock and poultry feed as source of essential amino acids such as lysine.

That is why the processes for extracting and refining the components of the pea traditionally only target its protein part.

However, the value of pea starch, rich in amylose, can be enhanced for certain food and nonfood applications if it is sufficiently refined.

The internal fibers of pea can also be used in certain food applications (high water retention power, binding and stabilizing powers), or even certain pharmaceutical applications, depending on sufficient refining.

Most conventional processes for extracting the components of pea target the protein part, the starch and the fibres are therefore only indirectly isolated and in an insufficient state of refining.

As VOSE et al. describe very generally in a review in Cereal Chemistry, 1980, 57(6), pp. 406–416, specialists in the field of extraction of the components of pea use the technical developments based on the conventional wet process for the treatment of corn, combined with technologies which are themselves derived from the industry of soybean isolates.

The first stage of the processes for extracting pea proteins consists either in soaking the pea in water, and then in grinding it in a wet phase, or in preparing a flour from peas which have been previously cleaned, sorted, blanched, freed of dust and ground, and then in placing the flour thus obtained in water.

It is known that pea proteins have a solubility of only 85% in water at neutral pH, and that the higher the pH of the suspension, the higher the solubility of said proteins.

In these prior art processes, said pea suspension before grinding or the flour milk derived from ground peas is therefore brought to a pH of 9 by adding calcium hydroxide or sodium hydroxide, in order to solubilize the proteins at more than 95% (so-called "alkaline steep" technique).

The centrifugation of this flour suspension leads to two fractions being obtained.

The light fraction corresponds to the protein solution which should be dried or spray-dried in order to obtain a protein concentrate having a protein content of the order of 60%.

The heavy fraction contains the starch however still containing 6% of proteins.

It is therefore necessary to repeat the alkaline steep stage for this starch-rich fraction in order to remove the associated proteins therefrom, and to try to obtain a fraction containing essentially starch.

Even under these conditions, the pea starch fraction still contains of the order of 2% of residual proteins, which is still far from being satisfactory; a sufficient degree of purity may be estimated at a value of at most 0.5% of residual proteins.

To overcome the problem of obtaining pea proteins of better quality, other techniques are described which lead instead to the production of pea protein isolates.

These pea protein isolates are in fact obtained by an operation of selective precipitation of the proteins at their isoelectric pH or pI (by coagulation) at room temperature or at a higher temperature (up to the boiling point), but also by the use of organic solvents or by the use of media at high ionic strength.

These isolates can also be obtained by membrane techniques of the ultrafiltration type.

As illustration of these techniques for precipitating proteins at their pI, there is for example in the state of the art Patent DD 275,609.

In the process described by this patent, the proteins are first extracted at an alkaline pH by wet treatment with calcium hydroxide of the pea flour, and then the proteins are precipitated at their pI by lowering the pH of the medium with phosphoric acid to a value of the order of 4.6.

This process is far from being satisfactory because the supernatant containing the still soluble proteins must be retreated with calcium hydroxide in order to eliminate the phosphoric acid in excess and then heated to a temperature of between 80 and 150° C. so as to be recycled and reused during future extractions.

The isolated proteins are purer, but this is achieved at the expense of the protein recovery yields and the content of the starch and internal fiber contents is not improved as a result.

The tedious and cumbersome nature of this process does not make it particularly attractive from the industrial point of view.

U.S. Pat. No. 4,766,204 describes a process which makes it possible to better separate the proteins from the starch (or from the sugars) of leguminous plants such as the pea or broad beans, while partially dispensing with the alkaline treatment.

This process consists in suspending the finely ground leguminous plant flour in water at a pH of between 2 and 10.

The inventors of this patent however recommend suspending the flour in an acidic medium (preferred pH between 2.2 and 3.2)in order to avoid the development of unpleasant odors or tastes in the proteins recovered at the end of the extraction process.

Next, this acidulated flour suspension is subjected to a first sieving stage in order to remove the pea's internal fibers.

This first stage is made necessary by the fact that the pea's internal fibers very easily bind to the pea starch and proteins. The washings of these fibers then have to be multiplied in order to extract the starch or associated proteins therefrom.

Prior to all the stages for extracting and separating the starch and the proteins, it is highly recommended to remove the internal fiber fractions as rapidly as possible in the first stages of the processes used.

After this sieving stage, centrifugation of the suspension freed of the internal fibers is carried out in order to generate a "light phase" predominantly containing the proteins, and a "heavy phase" predominantly containing the starch.

Finally, it is necessary to adjust the pH of these light and heavy phases so as to isolate therefrom the proteins and starch respectively.

For the light phase, the pH is brought to between 4.4 and 4.6, a pH interval known to cause precipitation of the pea proteins at their isoelectric point.

It is necessary to carry out another alkaline treatment of the heavy phase (still containing some proteins) in order to solubilize the residual proteins. It is then proposed to again centrifuge the mixture thus treated using decanters or vertical centrifuges or using a series of hydrocyclones, in order to recover a "cleaner" starch fraction.

The residual proteins are in turn coagulated separately and added to the main fraction of the proteins obtained further upstream in the process.

The process first of all requires putting in place a series of many sieves in order to remove the internal fiber fraction, a preliminary step which is essential for the separation of the pea proteins and starch.

The difficulty in using these sieves, the frequency for cleaning them and their maintenance cost do not make this sieving stage industrially viable.

It is moreover necessary to manage, with a great deal of precision, the variations in pH of the various fractions, and this renders extremely complex the use of the series of decanters, centrifuges and hydrocyclones.

As for the extraction of starch as main component of pea, little work has been devoted to it, despite its numerous possibilities of applications, given its relatively high content of amylose.

The starch yield of pea varieties is by far lower than the yield per hectare of species such as corn, wheat or potato. Pea is not therefore a leguminous plant which is considered with attention by starch industrialists.

MEUSER et al., in CEREAL CHEMISTRY, 74(4), pp. 364–370 (1997) have described a pilot method which proposes to extract pea starch and have presented it as being industrially viable.

The process, in three main steps, consists in soaking the pea in water, in decorticating the wet pea and in disintegrating the proteins adhering to the starch granules by means of a high-pressure homogenizer.

The fibers are first of all removed from the ground product of wet pea by means of vibrating sieves, before putting it through a high-pressure homogenizer.

It is observed once again that it is necessary to remove the internal fibers of the pea before undertaking the actual extraction of the starch and protein components.

The suspension thus freed of fibers then contains insoluble protein particles, particles consisting of a mixture of starch and proteins, and soluble proteins.

At this stage of the process, a centrifugal decanter separates the insoluble proteins (in the light phase) from the soluble proteins and the starch and protein particles (in the heavy phase).

The heavy phase is then conveyed to the high-pressure homogenizer in order to break the agglomerates of starch particles and their associated proteins.

The suspension treated on this homogenizer is then transferred to hydrocyclones using water counter-currentwise in order to separate the proteins from the starch.

This process, which is based on the recovery of the starch, is particularly cumbersome if it is desired to also use it for the concommitant recovery of the proteins.

It is indeed necessary to reunite the light phases obtained from the hydrocyclones, the light phases obtained from the centrifugal decanter plus the streams obtained from pressing the fibers in order to recover the maximum amount of insoluble proteins.

It is finally necessary to recover the heavy phases obtained from the hydrocyclones, to centrifuge them, and to ultrafilter the light phases obtained from this centrifugation in order to recover the soluble proteins.

The soluble proteins must again be extracted by techniques such as coagulation at the isoelectric pH or with heat or alternatively by ultrafiltration.

From the preceding text, it appears that there is no simple process integrating the technological constraints linked to the extraction of the four main components of pea, i.e. the starch, the proteins, the internal fibers and the solubles, in particular the extraction of the starch and the proteins, this being at a high degree of purity, with the best yield and productivity.

It is to the credit of the applicant company to have succeeded in reconciling these objectives which are not easily reconcilable, by devising and developing, at the cost of numerous research studies, a simple and effective process for extracting and refining the components of pea flour.

It is also to the credit of the applicant company to have shown that the use of centrifugal decanters or of hydrocyclones in a configuration used in a potato starch factory makes it possible to dispense with the requirement to remove the internal fibers of the pea before undertaking all the actual stages of fractionation of the proteins of the starch and of the solubles.

The process for extracting and refining the components of pea flour in accordance with the invention therefore consists in preparing the pea flour by grinding dried peas which have been previously cleaned, sorted, blanched, freed of dust, placing the flour thus obtained in water and separating the components of the pea flour using at least one of the pieces of equipment chosen from the group consisting of hydrocyclones, centrifugal decanters and sieves, without a stage for separating the internal fibers of the pea being carried out beforehand.

In a first preferred embodiment of the process of extraction and refining in accordance with the invention, it is chosen to use, as pieces of equipment for potato starch factory, centrifugal decanters and sieves.

In a first step of the process in accordance with this preferred embodiment, the flour obtained from peas which have been previously cleaned, sorted, blanched, freed of dust and ground is suspended in water.

The pea flour is obtained from peas which have been previously cleaned, sorted, blanched, freed of dust by any technique known to the person skilled in the art.

There is advantageously chosen a hammer mill of the ALPINE type, equipped with a 100 μm screen, as will be exemplified below.

It is advantageously chosen to then suspend in water a flour having a mean particle size having a value at most equal to 100 μm, at the concentration of 20 to 30% by dry weight, preferably at 25% dry weight.

The pH of the solution is not a limiting factor, but it is advantageously chosen not to correct the pH of the suspension, which leads to working in a pH range between 6.2 and 7.

In a second step of the process in accordance with this preferred embodiment, it is advantageously chosen to directly subject said aqueous flour suspension to the action of a centrifugal decanter.

The pea fiber fraction is not therefore removed by prior sieving.

The applicant company has indeed observed that the fact that this separation operation is carried out with centrifugal decanters according to a configuration used in a potato starch factory makes it possible to easily separate, into two distinct fractions, the solubles and the proteins on the one hand, and the fibers and the starch on the other hand.

In a third step of the process in accordance with this preferred embodiment, the proteins are then easily isolated from the fraction containing the mixture of solubles and proteins thus obtained, by a technique chosen from the group of techniques of precipitation of proteins at their isoelectric pH and/or of membrane separation of the ultrafiltration type.

The solubles are then recovered as such in the precipitation supernatant or in the ultrafiltration permeate.

In a fourth step of the process in accordance with this preferred embodiment, the starch is separated from the internal fiber fractions using sieves according to a configuration used in a starch factory.

Operations for sieving on rotary sieves and curved sieves are advantageously chosen.

This step thus makes it possible to separate more efficiently the internal fibers from the starch, and with little sieving and thus with far fewer difficulties of maintaining the pieces of equipment than in the processes already described where the sieves are placed at the beginning of the process, which thus have to treat the entire stream.

The purified starch is then recovered and concentrated from the fraction freed of fibers by any technique known to the person skilled in the art.

In a second preferred embodiment of the process for extracting the components of pea flour in accordance with the invention, it is chosen to use as pieces of equipment for a potato starch factory, hydrocyclones and centrifugal decanters.

In a first step of the process in accordance with this second preferred embodiment, the flour obtained from peas previously cleaned, sorted, blanched, freed of dust and ground is also suspended in water.

The pH of the solution is not a limiting factor, but it is chosen not to correct the pH of the suspension, which leads to working in a pH range between 6.2 and 7.

The suspension is allowed to diffuse in this aqueous medium in a short time, between 5 min and 2 hours, at a temperature between 15° C. and 25° C., preferably at room temperature.

In a second step of the process in accordance with this second preferred embodiment, it is chosen to directly subject said aqueous flour suspension to a series of hydrocyclones without removing the fiber fraction of the pea by prior sieving.

The applicant company has thus observed that the fact that this operation of separation with hydrocyclones according to a configuration used in a potato starch factory is chosen makes it possible to easily separate into two distinct fractions the starch of high purity on the one hand, and the solubles, the fibers and the proteins on the other hand.

In a third step of the process in accordance with this second preferred embodiment, the starch-rich suspension is optionally concentrated on said hydrocyclones so as to purify the starch thereof.

This operation may also be carried out using another series of hydrocyclones.

However, as will be exemplified below, the applicant company has observed, surprisingly and unexpectedly, that the degree of purity of the starch fraction directly obtained using hydrocyclones is such that this starch fraction requires an additional refining stage only if it is desired to obtain a starch containing no more than 0.2% of residual proteins.

In a fourth step of the process in accordance with this second preferred embodiment, the internal fibers of a fraction rich in proteins and in solubles are easily separated using centrifugal decanters according to a configuration used in the treatment of potato vegetation water.

In a fifth step of the process in accordance with this second preferred embodiment, the proteins are easily isolated from the fraction containing the mixture of solubles and proteins which is thus obtained, by a technique chosen from the group of techniques of precipitation of proteins at their isoelectric pH and of techniques of membrane separation of the ultrafiltration type.

The process for extracting and refining the components of pea flour in accordance with the invention finally consists in that this process is carried out using at least one of the pieces of equipment from a potato starch factory, chosen from the group consisting of hydrocyclones, centrifugal decanters and sieves.

The use of these processes may be advantageously carried out in a particular device, but better still directly in an industrial starch unit for the treatment of potato, in between campaigns.

The invention therefore also relates to a device for extracting and refining the components of pea flour comprising at least one of the pieces of equipment from a potato starch factory, chosen from the group consisting of hydrocyclones, centrifugal decanters and sieves.

A first device comprises, as pieces of equipment from a potato starch factory, sieves and centrifugal decanters.

A second device comprises, as pieces of equipment from a potato starch factory, hydrocyclones and centrifugal decanters.

The use of these devices makes it possible to obtain fractions of great richness with an excellent yield.

It was thus observed that more than 90% of the proteins initially present could be extracted, and that the starch could be obtained with a purity of at least 99.5%.

Measurements of the level of residual proteins, of the pH and of the BRABENDER viscosity of the pea starch obtained according to the process in accordance with the invention were carried out.

The starch prepared by the process in accordance with the invention has a residual protein content of between 0.3 and 0.5% and a pH value of between 3.5 and 7, preferably between 5 and 7.

The method for determining the protein content used here is that by DUMAS (NF V 18-120 standard of March 1977—method by combustion—nitrogen assay).

The pH of the pea starch is determined at room temperature on a solution containing 20 g dry weight in 80 ml of demineralized water.

The starch prepared by the process in accordance with the invention additionally has a BRABENDER viscosity, determined according to an A test, of between 950 and 1 100 BU, preferably between 970 and 1 050 BU.

The test A is a test developed by the applicant company, which consists in determining the viscosity, in a sodium medium, of a suspension of starchy material using the BRABENDER viscograph.

This measurement of viscosity is carried out under precise concentration conditions and based on a suitable temperature/time programme.

The description of this test is as follows: 20.9 g of dried pea starch are prepared and there are added thereto 48 g of a 1 N sodium hydroxide solution and 470 g of demineralized water whose resistivity is greater than 500 000 ohms, in a 600 ml beaker.

This mixture is produced at room temperature in the bowl of the BRABENDER Pt100 viscometer. Rapid heating of the mixture is then carried out up to 35° C., at the rate of 3°/min, using said equipment. The mixture is kept at this temperature for 5 minutes, and then the temperature is increased at the rate of 2.5° /min up to 92° C. This temperature is maintained for 20 min.

The viscosity, expressed as BRABENDER Units (BU), then corresponds to the value of the viscosity peak measured.

Other characteristics and advantages of the present invention will appear clearly on reading the examples given below which illustrate the invention without however limiting it.

EXAMPLE 1

Pea flour is prepared by grinding decorticated field peas on a hammer mill of the ALPINE type equipped with a 100 µm screen.

300 kg of flour containing 87% dry matter are then soaked in water at the final concentration of 25% on a dry basis, at a pH of 6.5, for 30 minutes at room temperature.

1 044 kg of flour suspension containing 25% dry matter (i.e. 261 kg of dry flour) are then introduced with 500 kg of water into a series of hydrocyclones adapted from an industrial starch unit for treating potato.

This series of hydrocyclones is composed of 14 stages. It is fed with the flour suspension at the No. 5 stage.

This separation leads to the production of a light phase which corresponds to the outlet of the No. 1 stage. It consists of the mixture of proteins, internal fibers and solubles.

The heavy phase, containing the starch, is the concentrate obtained at the level of the No. 14 stage.

The inlet of the No. 14 stage is supplied with water for washing.

This separation on hydrocyclones leads to the production of a light phase, consisting of the mixture of proteins, internal fibers and solubles, and a heavy phase composed of pea starch.

297 kg of starch milk containing 40% dry matter (i.e. 119 kg of starch on a dry basis) are recovered in the heavy phase.

The content of impurities is less than 1%, the content of proteins is 0.3% on a dry basis.

It is thus not necessary to carry out additional refining of this fraction.

The light phase at the outlet of the hydrocyclones contains, for its part, as a mixture (142 kg on a dry basis in total): the fibers (about 14.8% by weight, i.e. 21 kg on a dry basis), the proteins (about 42.8% by weight, i.e. 60.8 kg on a dry basis) and solubles (about 42.4% by weight, i.e. 60.2 kg on a dry basis).

It is then brought to a dry matter content of 11.4%.

The separation of the fibers is carried out on centrifugal decanters of the WESPHALIA type, which are used in an industrial starch unit for treating potato.

The light phase at the outlet of the centrifugal decanter contains a mixture of proteins and solubles, while the heavy phase contains the pea fibers.

The heavy phase contains 105 kg of fibers at 20% dry matter. It is observed that practically all the fibers are found in this fraction.

As for the protein and solubles fraction, it contains 1 142 kg of a mixture of solubles and proteins in solution.

The coagulation of the proteins at their isoelectric point is carried out by adjusting the light phase at the outlet of the centrifugal decanter to a pH of 4.6 and heating this solution to 100° C.

After precipitating the proteins, centrifugal decantation is carried out, which makes it possible to recover, after drying, sediment containing 56 kg of proteins (86% of N 6.25 on a dry basis) containing 93% dry matter.

EXAMPLE 2

The physicochemical characteristics of the pea starch prepared according to the process described in example 1, reproduced four times, are determined.

The following table presents the results obtained for the protein content, the pH and the viscosity according to the test A determined on the four samples thus obtained.

Physicochemical characteristics of 4 samples of pea starch extracted according to a process in accordance with the invention.

|  | Sample 1 | Sample 2 | Sample 3 | Sample 4 |
| --- | --- | --- | --- | --- |
| Residual protein content (%) | 0.3 | 0.45 | 0.5 | 0.45 |
| pH | 6.9 | 5.8 | 5.2 | 5.6 |
| Viscosity (BU) | 1 010 | 970 | 1 030 | 1 050 |

These results show that the pea starch, obtained directly after the stage of passing through hydrocyclones, has a completely satisfactory residual protein content, and a pH value which reflects the treatment without correction of the pH of the flour suspension upstream of the process.

Measurements carried out on commercially available pea starches give protein contents of between 0.18 and 0.25%, but pH values for pea starch in solution less than 3.5 or greater than 7.

The pea starch obtained according to the process in accordance with the invention is thus completely novel compared with other pea starches.

Moreover, it is remarkable that the pea starches prepared according to the process in accordance with the invention have viscosities between 970 and 1 050 BU, whereas measurements carried out on commercial pea starches according to the test A show viscosity values greater than 1 280 BU.

The invention claimed is:

1. A process for extracting and refining the components of pea flour, which comprises the following steps:
    a) preparing a pea flour by grinding dried peas which have been previously cleaned, sorted, blanched, freed of dust,
    b) placing the flour thus obtained in water to form a suspension that is maintained at a pH between 6.2 and 7,
    c) separating the components of the pea flour by treating said suspension in at least one piece of equipment in an industrial potato starch unit selected from the group consisting of hydrocyclones, and centrifugal decanters without a step for separating the internal fibers of the pea from said suspension being carried out beforehand, and
    d) collecting the protein component and/or the starch component of said pea flour.

2. The process as claimed in claim 1, wherein the pieces of equipment in said industrial starch unit are centrifugal decanters.

3. A process for extracting and refining the components of pea flour, comprising:
    a) preparing a pea flour by grinding dried peas which have been previously cleaned, sorted, blanched, freed of dust, and suspending the pea flour in water to form a suspension that is maintained at a pH between 6.2 and 7,
    b) fractionating said suspension on centrifugal decanters in an industrial potato starch unit, so as to isolate a fraction rich in proteins and solubles from a fraction containing the starch and internal fiber mixture,
    c) isolating the protein component of said fraction rich in proteins and solubles by a selective protein purification technique,
    d) treating the fraction containing the mixture of starch and internal fibers on sieves in said industrial starch unit, so as to separate a fraction rich in internal fibers from a fraction rich in starch,
    e) isolating the starch component of said fraction rich in starch, and
    f) collecting said protein component and/or said starch component.

4. The process as claimed in claim 1, wherein the pieces of equipment in said industrial starch unit are hydrocyclones and centrifugal decanters.

5. A process for extracting and refining the components of pea flour, which comprises the following steps:
   a) preparing a pea flour by grinding dried peas which have been previously cleaned, sorted, blanched, freed of dust, and suspending the pea flour in water at a pH between 6.2 and 7,
   b) fractionating said suspension on hydrocyclones in an industrial potato starch unit, so as to isolate a fraction rich in starch from a fraction containing a mixture of protein, internal fiber and solubles,
   c) optionally concentrating the suspension rich in starch on said hydrocyclones so as to purify the starch thereof,
   d) treating the fraction containing the mixture of proteins, internal fibers and solubles on centrifugal decanters in said industrial starch unit, so as to separate a fraction rich in internal fibers from a fraction rich in proteins and solubles,
   e) isolating the protein component of said fraction rich in proteins and solubles by a selective protein purification technique, and
   f) collecting said protein component and/or said starch component.

6. The process as claimed in claim 1, wherein the protein component is purified using a technique selected from the group consisting of techniques of precipitation of proteins at their isoelectric pH and of membrane separation of the ultrafiltration type.

7. A process for extracting and refining the components of pea flour, comprising at least one step carried out in an industrial starch unit for the treatment of potato, wherein said step is for separating said components of pea flour using at least one piece of equipment of said industrial starch unit selected from the group consisting of hydrocyclones centrifugal decanters, wherein said separating step is performed on a suspension of pea flour that is maintained at a pH between 6.2 and 7.

8. A process for extracting and refining the components of pea flour, comprising at least one step carried out in an industrial starch unit for the treatment of potato, wherein said step is for separating said components of pea flour centrifugal decanters of said industrial starch unit, wherein said separating step is performed on a suspension of pea flour that is maintained at a pH between 6.2 and 7.

9. A process for extracting and refining the components of pea flour, comprising at least one step carried out in an industrial starch unit for the treatment of potato, wherein said step is for separating said components of pea flour using hydrocyclones and centrifugal decanters of said industrial starch unit, wherein said separating step is performed on a suspension of pea flour that is maintained at a pH between 6.2 and 7.

10. A process for extracting and refining starch from pea flour, which comprises the following steps:
   a) preparing a pea flour by grinding dried peas which have been previously cleaned, sorted, blanched, freed of dust, and suspending the pea flour in water, without correcting the pH of the suspension, such that the suspension is maintained at a pH between 6.2 and 7,
   b) fractionating said suspension on hydrocyclones in an industrial potato starch unit, so as to isolate a fraction rich in starch from a fraction consisting of a mixture of protein, internal fiber and solubles,
   c) optionally concentrating the suspension rich in starch on said hydrocyclones so as to purify the starch thereof, and
   d) collecting the starch component of said pea flour.

11. A process for extracting and refining proteins from pea flour, which comprises the following steps:
   a) preparing a pea flour by grinding dried peas which have been previously cleaned, sorted, blanched, freed of dust, and suspending the pea flour in water, without correcting the pH of the suspension, such that the suspension is maintained at a pH between 6.2 and 7,
   b) fractionating said suspension on hydrocyclones in an industrial potato starch unit, so as to isolate a fraction rich in starch from a fraction containing a mixture of protein, internal fiber and solubles,
   c) treating the fraction containing the mixture of proteins, internal fibers and solubles on centrifugal decanters, so as to separate a fraction rich in internal fibers from a fraction rich in proteins and solubles,
   d) isolating the protein component of said fraction rich in proteins and solubles by a selective protein purification technique, and
   e) collecting said protein component.

* * * * *